United States Patent
Isgar

(10) Patent No.: US 12,008,662 B2
(45) Date of Patent: Jun. 11, 2024

(54) SYSTEM FOR SOCIAL INTERACTION REGARDING FEATURES BASED ON GEOLOCATION

(71) Applicant: Charles Isgar, Scottsdale, AZ (US)

(72) Inventor: Charles Isgar, Scottsdale, AZ (US)

(*) Notice: Subject to any disclaimer, the term of this patent is extended or adjusted under 35 U.S.C. 154(b) by 0 days.

(21) Appl. No.: 17/888,733

(22) Filed: Aug. 16, 2022

(65) Prior Publication Data
US 2022/0391997 A1 Dec. 8, 2022

Related U.S. Application Data

(63) Continuation of application No. 16/738,267, filed on Jan. 9, 2020, now abandoned.

(60) Provisional application No. 62/790,231, filed on Jan. 9, 2019.

(51) Int. Cl.
G06Q 50/00 (2012.01)
G06T 11/00 (2006.01)
H04W 4/029 (2018.01)

(52) U.S. Cl.
CPC .............. G06Q 50/01 (2013.01); G06T 11/00 (2013.01); H04W 4/029 (2018.02)

(58) Field of Classification Search
CPC .. G06K 9/0067; G06K 9/00671; G06Q 50/01; G06Q 50/16; H04M 2203/359; G06T 11/00; H04W 4/029
See application file for complete search history.

(56) References Cited

U.S. PATENT DOCUMENTS

| | | |
|---|---|---|
| 8,878,750 B1 | 11/2014 | Park et al. |
| 2008/0147730 A1 | 6/2008 | Lee et al. |
| 2010/0008265 A1 | 1/2010 | Freer |
| 2010/0318451 A1 | 12/2010 | Niccolini et al. |
| 2012/0208551 A1 | 8/2012 | Hill |
| 2012/0240077 A1 | 9/2012 | Vaittinen et al. |
| 2013/0027227 A1 | 1/2013 | Nordstrom |
| 2013/0073389 A1 | 3/2013 | Heath |

(Continued)

OTHER PUBLICATIONS

Steele, Billy "Realtor.com uses augmented reality to help you find a new home" engadget Jan. 17, 2017; available at: https://www.engadget.com/2017-01-17-realtor-com-augmented-reality-house-hunting.html (Year: 2017).*

(Continued)

*Primary Examiner* — Brendan S O'Shea
(74) *Attorney, Agent, or Firm* — Schmeiser, Olsen & Watts LLP

(57) ABSTRACT

Described is a system for social interaction regarding features based on geolocation. The system includes a server having a memory storing geo-grouped feature data and a user computing device coupled to the server. The server may be programmed to receive location information from the user computing device to automatically determine a feature or features near a location of the user computing device The server automatically finds and retrieves geo-grouped feature data corresponding to the feature and automatically delivers the geo-grouped data to the user computing device for access as bubbles of data floating above the feature. The server can then receive and store a post from the user computing device as part of the geo-grouped feature data. The system allows users to interact with each other without preestablished connections of users.

3 Claims, 14 Drawing Sheets

(56) References Cited

U.S. PATENT DOCUMENTS

| | | |
|---|---|---|
| 2013/0346240 A1 | 12/2013 | Roberts |
| 2014/0100994 A1 | 4/2014 | Tatzel et al. |
| 2014/0168056 A1 | 6/2014 | Swaminathan et al. |
| 2014/0171039 A1 | 6/2014 | Bjontegard |
| 2014/0279018 A1 | 9/2014 | Hardin et al. |
| 2015/0074570 A1 | 3/2015 | Takimoto et al. |
| 2015/0199436 A1 | 7/2015 | Bailey et al. |
| 2015/0206218 A1 | 7/2015 | Banerjee et al. |
| 2016/0098755 A1 | 4/2016 | Silvestro et al. |
| 2017/0090695 A1 | 3/2017 | Pierce et al. |
| 2018/0144524 A1 | 5/2018 | Lotto et al. |
| 2018/0196819 A1 | 7/2018 | Zhang et al. |
| 2018/0249063 A1 | 8/2018 | Averianov et al. |
| 2018/0261186 A1 | 9/2018 | Watson et al. |
| 2018/0352041 A1 | 12/2018 | Tasdemiroglu et al. |
| 2019/0066157 A1 | 2/2019 | Shahid et al. |
| 2019/0138260 A1 | 5/2019 | Rogers et al. |
| 2019/0179405 A1 | 6/2019 | Sun et al. |
| 2019/0251719 A1 | 8/2019 | Wang et al. |

OTHER PUBLICATIONS

Isgar, Charles, System for Interaction Regarding Real Estate Sales, Social and Business, Patent Cooperation Treaty Application Serial No. PCT/US21/12904, Filed Jan. 11, 2021, International Search Report and Written Opinion dated Feb. 17, 2021.

Isgar, Charles, System for Interaction Regarding Real Estate Sales, Social and Business, Patent Cooperation Treaty Application Serial No. PCT/US21/12904, Filed Jan. 11, 2021, International Search Report and Written Opinion dated Mar. 3, 2021.

* cited by examiner

SYSTEM FOR SOCIAL INTERACTION REGARDING FEATURES BASED ON GEOLOCATION

CROSS REFERENCE TO RELATED APPLICATION[S]

This application is a continuation of U.S. patent application entitled "SYSTEM FOR SOCIAL INTERACTION REGARDING FEATURES BASED ON GEOLOCATION," Ser. No. 16/738,267, filed Jan. 9, 2020, which claims priority to U.S. Provisional Patent Application entitled "SYSTEM FOR SOCIAL INTERACTION REGARDING FEATURES BASED ON GEOLOCATION," Ser. No. 62/790,231, filed Jan. 9, 2019, the disclosures of which are hereby incorporated entirely herein by reference.

BACKGROUND OF THE INVENTION

Technical Field

This invention generally relates to social interaction systems, and specifically to a system for social interaction, engagement and/or information regarding features based on geolocation, wherein the system may be an augmented reality system or a mixed reality system operating on a mobile computing device.

State of the Art

Individuals typically travel to or for work, for recreation, for vacation, for shopping and for any number of reasons. This travel may be by vehicle as a driver or passenger, by walking, by bicycles and the like. Often there are certain features that may include a certain building, naturally created feature, man-made feature, monument or the like that an individual may wish to comment on socially to others. This is generally done by the individual taking a picture, video or the like of the feature and then posting that picture, video or the like about that feature on any number of social network systems and providing a comment regarding it. This is done to elicit replies regarding the same feature from friends and others connected to that individual on the social network system(s) utilized. These social network interactions are limited to the established network of individuals already connected in some manner each other. There is not an ability in existing social network systems to post about a feature wherein that post is associated with the geolocation of the feature and available for any user when in proximity of the geolocation of the feature.

Accordingly, what is needed is a system for social interaction regarding features based on geolocation.

SUMMARY OF THE INVENTION

An embodiment includes a system for social interaction regarding features based on geolocation, the system comprising: a server having a memory storing geo-grouped feature data; and a user computing device coupled to the server, wherein the server is programmed to: receive location information from the user computing device; automatically process the location information and determine what features have an activated geolocation near the location of the user computing device; automatically find and retrieve geo-grouped feature data corresponding to the features near the geolocation of the user computing device; automatically deliver the geo-grouped data to the user computing device for access; and receive and store a post from the user computing device, wherein the post from the user is stored as part of the geo-grouped feature data. In embodiments, the geo-grouped data may be viewable as floating identifiers, such as floating bubbles over each feature and displayed on the screen of the user computing device.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a system for social interaction, engagement and/or information regarding features based on geolocation.

The system may include the use of a mobile application operating on a user computing device that may be a mobile computing device like a smartphone, a tablet, a wearable, and the like. In some embodiments, the user computing device may display floating identifiers, such as bubbles of geo-grouped feature data regarding certain features to be locationally associated with the certain features, floating above the features and accessible by the user computing devices.

Figure 1:
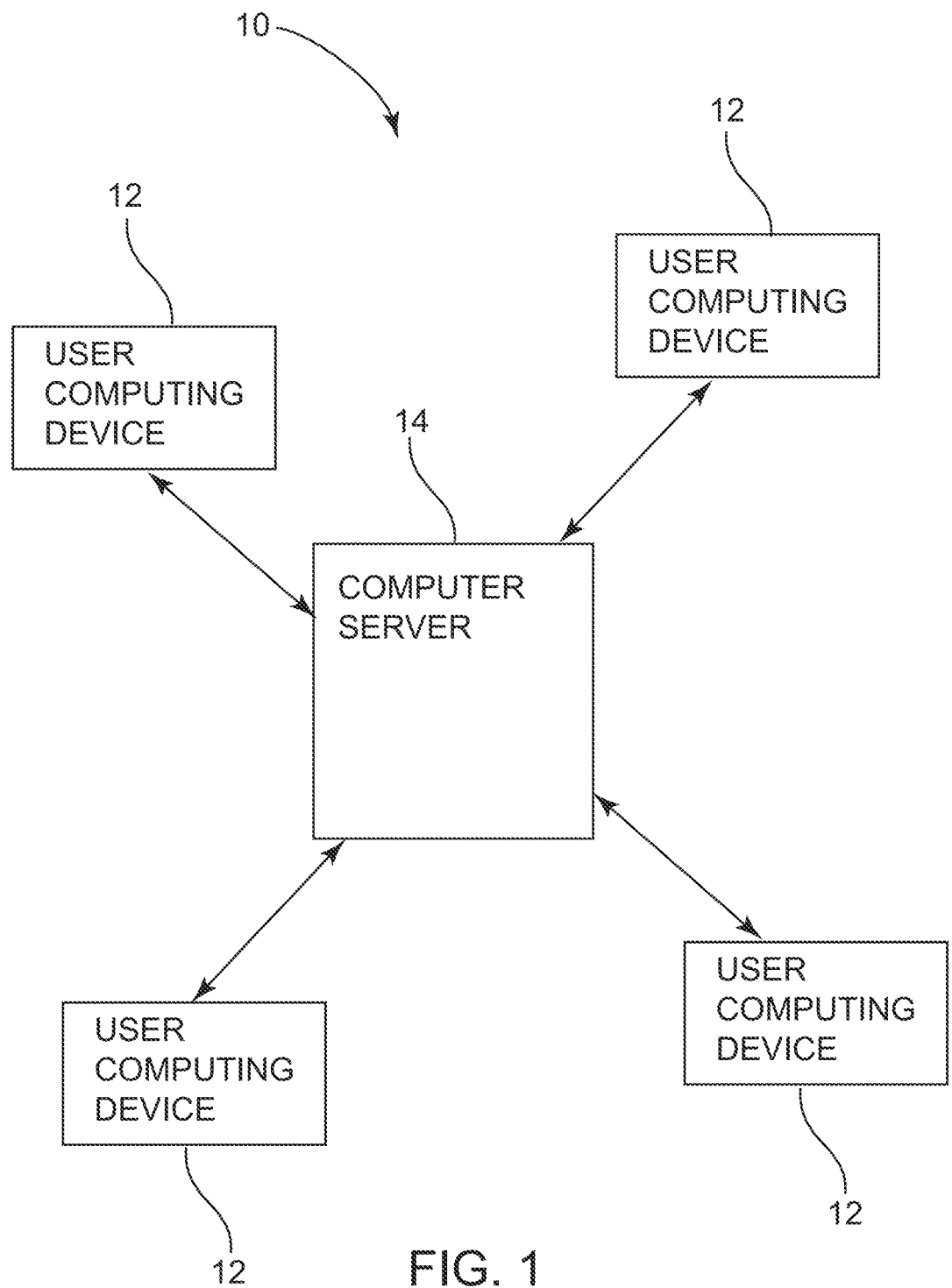
FIG. 1 a diagrammatic view of a system for social interaction regarding features based on geolocation according to an embodiment.
Figure 2:
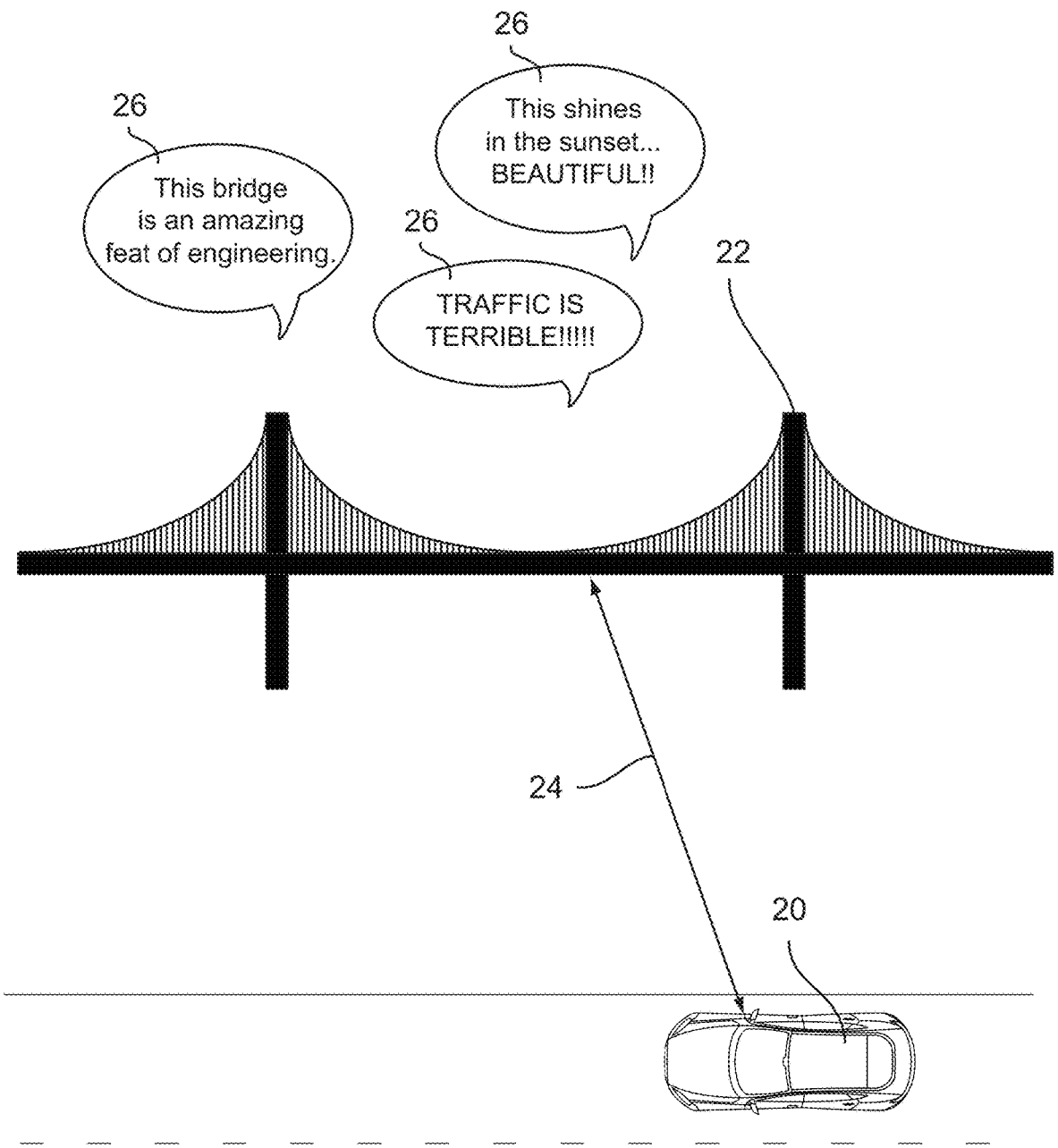
FIG. 2 depicts a system for social interaction regarding features based on geolocation used by an occupant of a vehicle that is a predetermined distance from a geolocation of a feature according to an embodiment.
Figure 3:
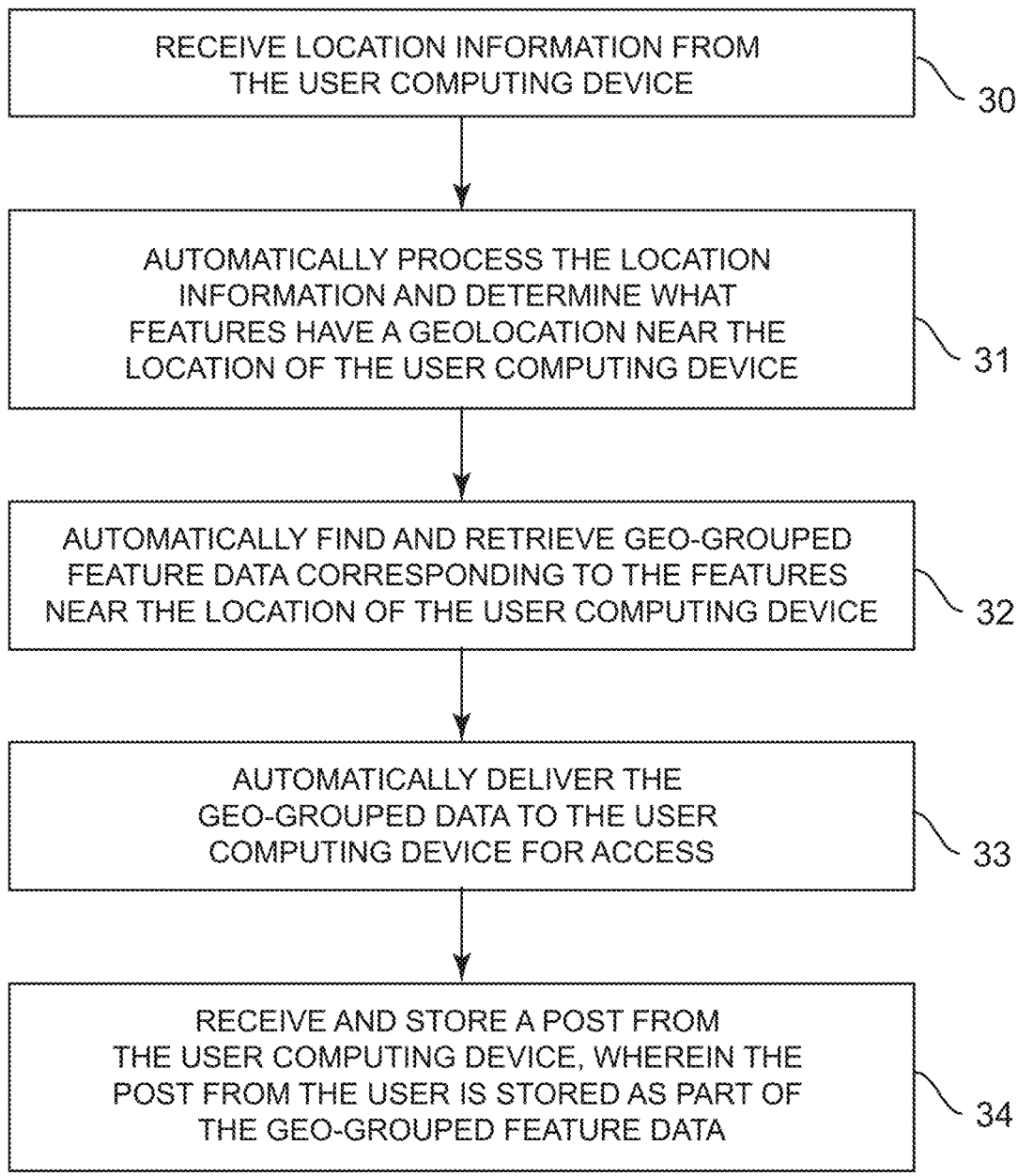
FIG. 3 is a flowchart of programmed instructions executed by a server of a system for social interaction regarding features based on geolocation according to an embodiment.

FIGS. 1-3 show an embodiment of a system 10 for social interaction regarding features based on geolocation. FIG. 1 shows a diagram of a system 10 for social interaction regarding features based on geolocation. FIG. 2 depicts a system 10 for social interaction regarding features based on geolocation used by an occupant of a vehicle, such as a car, a bus, a train or the like. FIG. 3 shows a flow chart of programming of a system 10 for social interaction regarding features based on geolocation. In embodiments, a user includes a driver, a passenger or the like in any type of vehicle, and further may include an individual walking, riding a bike, riding a scooter, or any other form of moving from one location to another location.

FIG. 1 depicts an embodiment of a system 10 for social interaction regarding features based on geolocation. The system 10 may include user computing devices 12 and a server 14, wherein each user computing device 12 is coupled to the computer server 14. This coupling may be a network connection, such as a wireless connection through an Internet connection, a Wi-Fi connection, a Bluetooth connection or the like, wherein the user computing devices 12 may communicate with and receive communication from the server 14. The user computing device 12 may include a desktop computer, a laptop, a tablet, a smartphone, wearable devices a vehicle-installed computing device and the like. The server 14, in some embodiments, may be a computer server or a cloud-based infrastructure architecture.

The server 14 may include a memory storing various data. The memory of the server 14 may store posts and location information corresponding to a particular feature, wherein location information for a feature is associated with each post regarding the feature and stored as a geo-grouped feature data. In other words, the posts regarding a particular feature are grouped together based on the geolocation of the feature and are collectively accessible to all users of the system 10 regardless of any separate association of users.

The user computing device 12 may be coupled to the server 14, and, referring to FIGS. 2 and 3, the server 14 may be programmed to receive location information from the user computing device (Step 30); automatically process the location information and determine what features have a geolocation near the location of the user computing device (Step 31); automatically find and retrieve geo-grouped feature data 26 corresponding to the features near the geolocation of the user computing device (Step 32); automatically deliver the geo-grouped data 26 to the user computing device for display and access (Step 33); and receive and store a post from the user computing device, wherein the post from the user is stored as part of the geo-grouped feature data 26 (Step 34). In some embodiments, the user computing device 12 may be utilized by an occupant of a vehicle 20 (See FIG. 2). The user computing device 12 may be operating a mobile app as part of the system 10, wherein operation of the mobile app couples the user computing device 12 to the server 14. The user computing device 12 operating the mobile app, may further be operated to determine its location and send the location data to the server through the established connection. This location data, for example, may be location data obtainable by a smartphone and then sent to the server 14.

As shown in FIG. 2, the user computing device 12 may be within vehicle 20 and the location may be sent to the server 14. The location may be within a predetermined distance 24 of the geolocation of the feature 22, thereby initiating the sending of geo-grouped feature data 26 corresponding to the geolocation of the feature 22 to the user computing device 12 within the vehicle 20.

Once the geo-grouped feature data 26 is sent to the user computing device 12, the geo-grouped feature data 26 is automatically displayed. In some embodiments, there may be several features that are available based on the location of the user computing device 12. In these instances, the server 14 may be programmed to send a list of geo-grouped feature data to the user computing device 12 for selection. The list may include different features, wherein the user may select a desired geo-grouped feature data associated with a desired feature to access on the user computing device 12. Further still, the server 14 may also be programmed to send a list of geo-grouped feature data to the user computing device for selection, the list including different content types of geo-grouped feature data of the feature or multiple features. The different content types of geo-grouped feature data may include text comments by other users, photos, graphics, videos, audio and the like. In embodiments, the server 14 may be programmed to supply lists for both multiple features and different types of content associated with the multiple features to the user computing device 12 for selection by the user.

Figure 4:
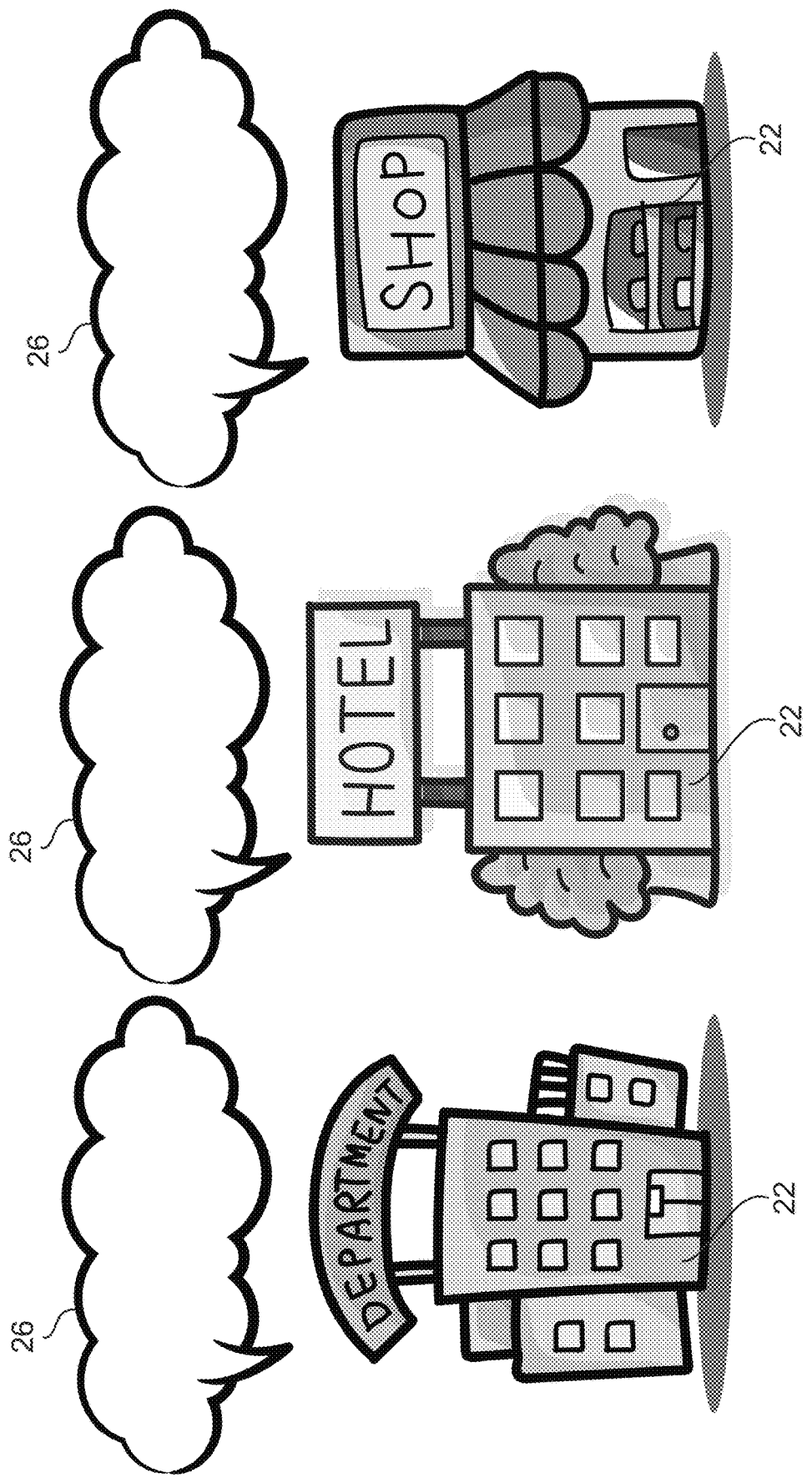
FIG. 4 depicts a system for social interaction regarding features based on geolocation with geo-grouped feature data viewable as floating identifiers such as bubbles according to an embodiment.
Figure 5:
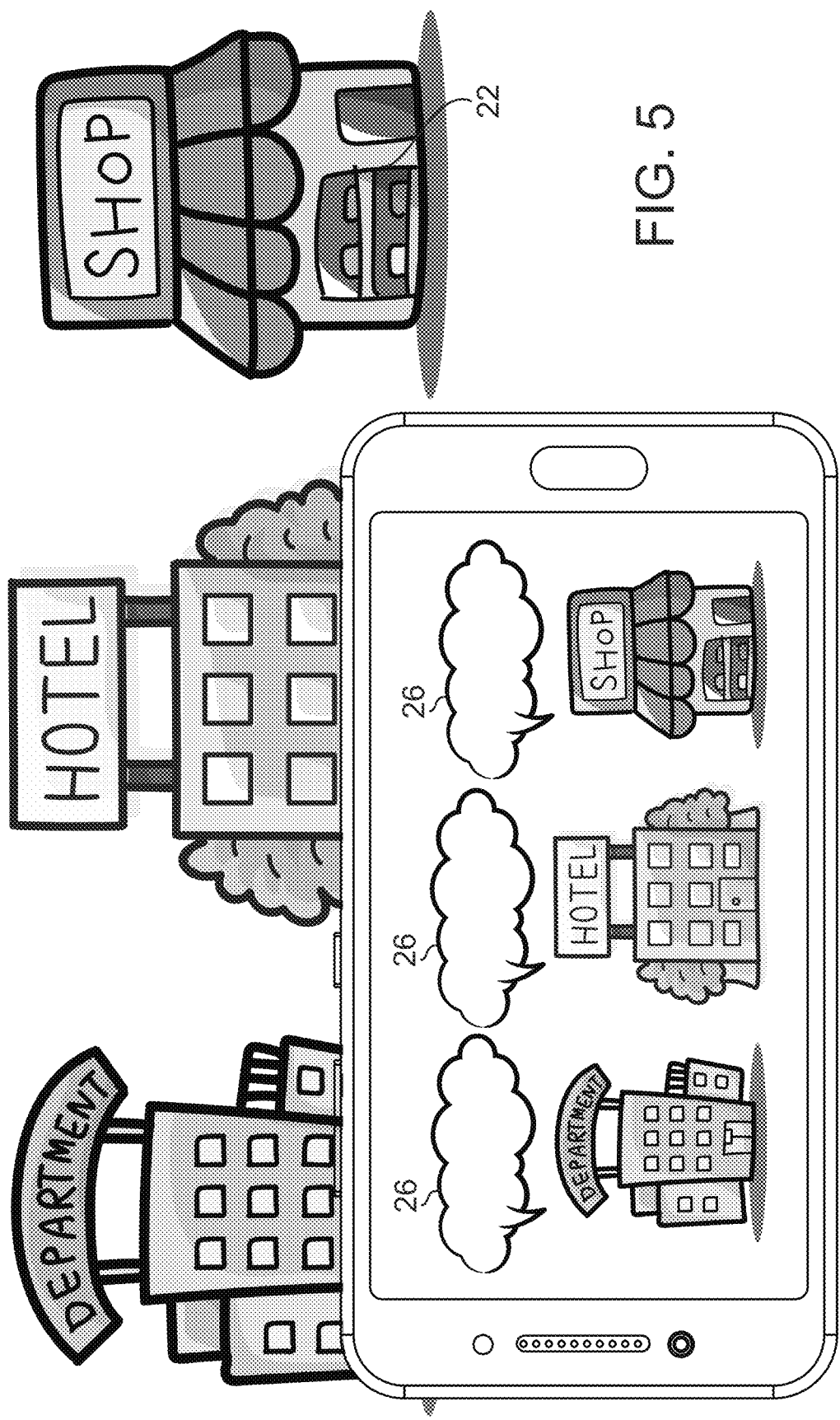
FIG. 5 depicts a system for social interaction regarding features based on geolocation with geo-grouped feature data viewable as floating identifiers such as bubbles on a user computing device according to an embodiment.
Figure 6:
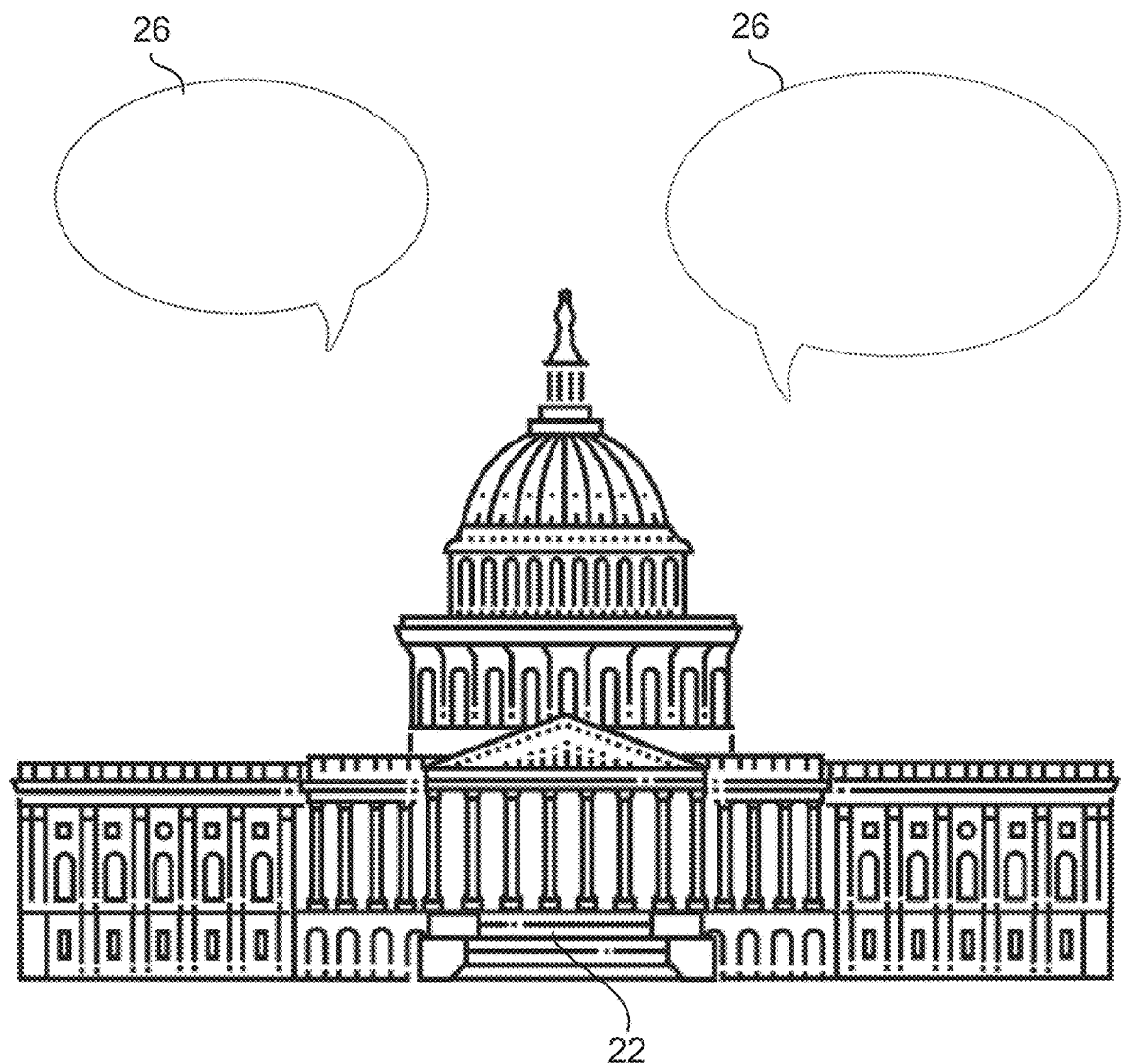
FIG. 6 depicts a system for social interaction regarding features based on geolocation with bubbles of geo-grouped feature data having differing colors according to an embodiment.
Figure 7:
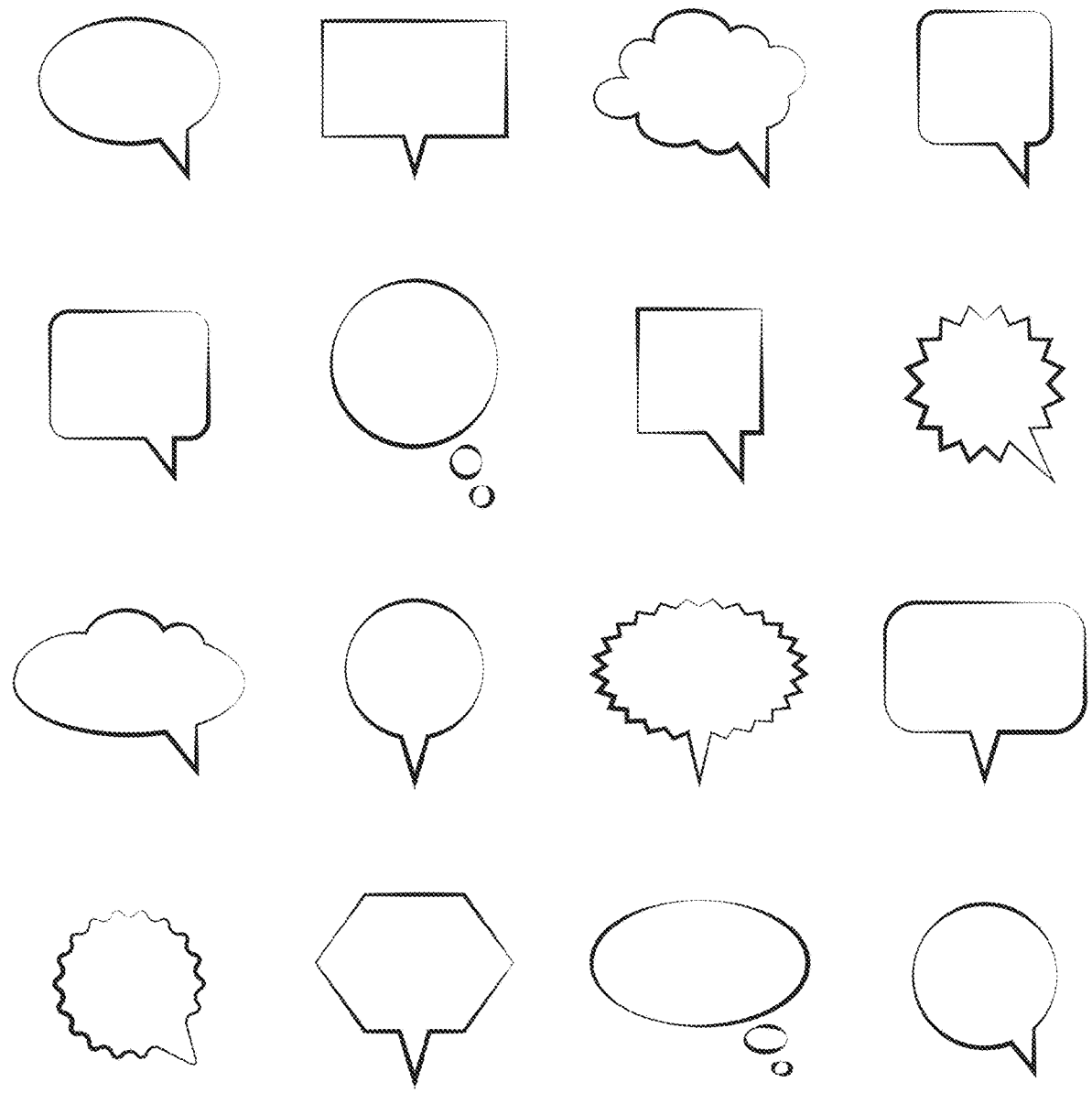
FIG. 7 depicts a various bubble shapes, colors and sizes for use in a system for social interaction regarding features based on geolocation according to an embodiment.
Figure 8:
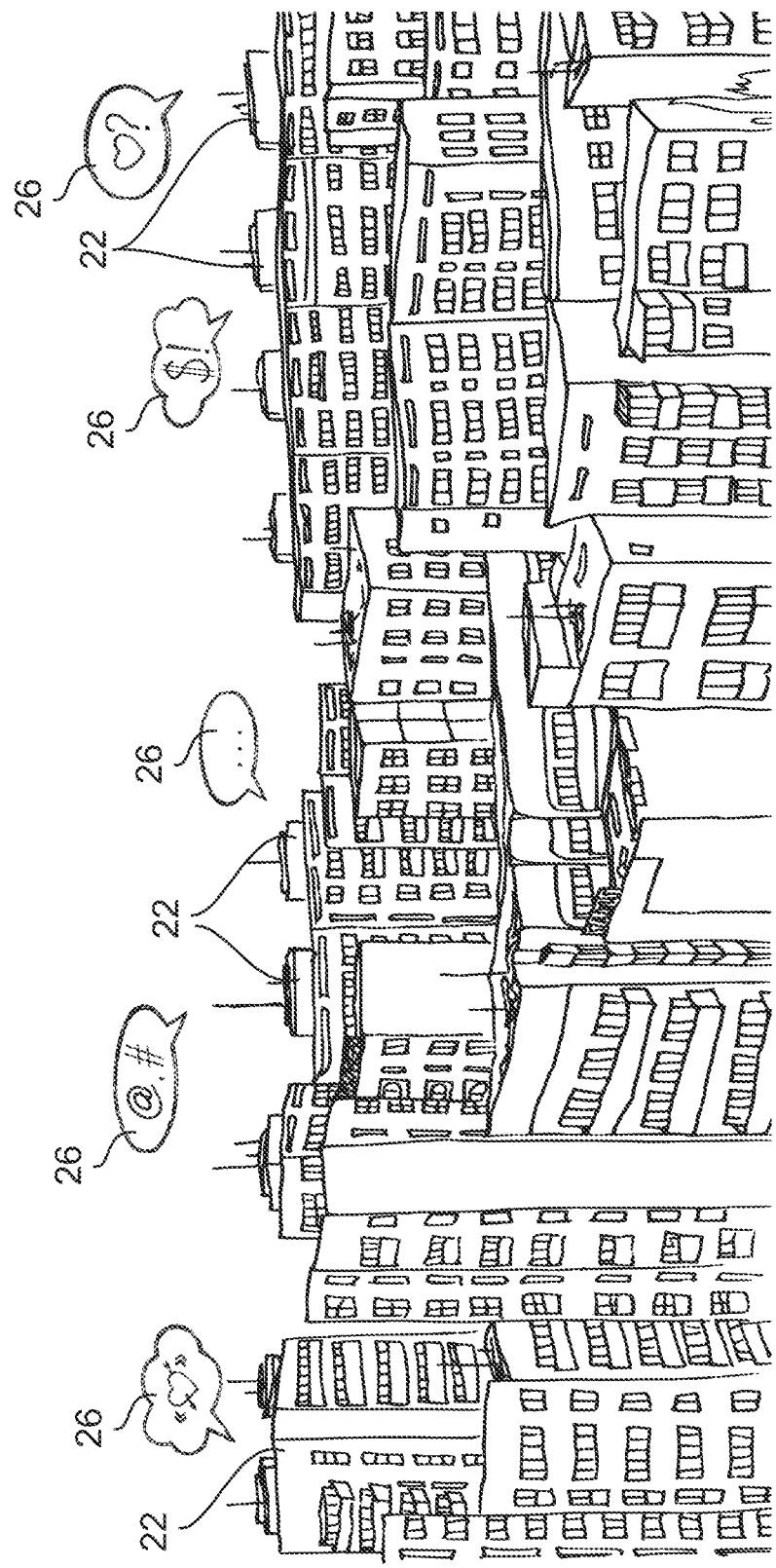
FIG. 8 depicts a system for social interaction regarding features based on geolocation according to an embodiment.
Figure 9:
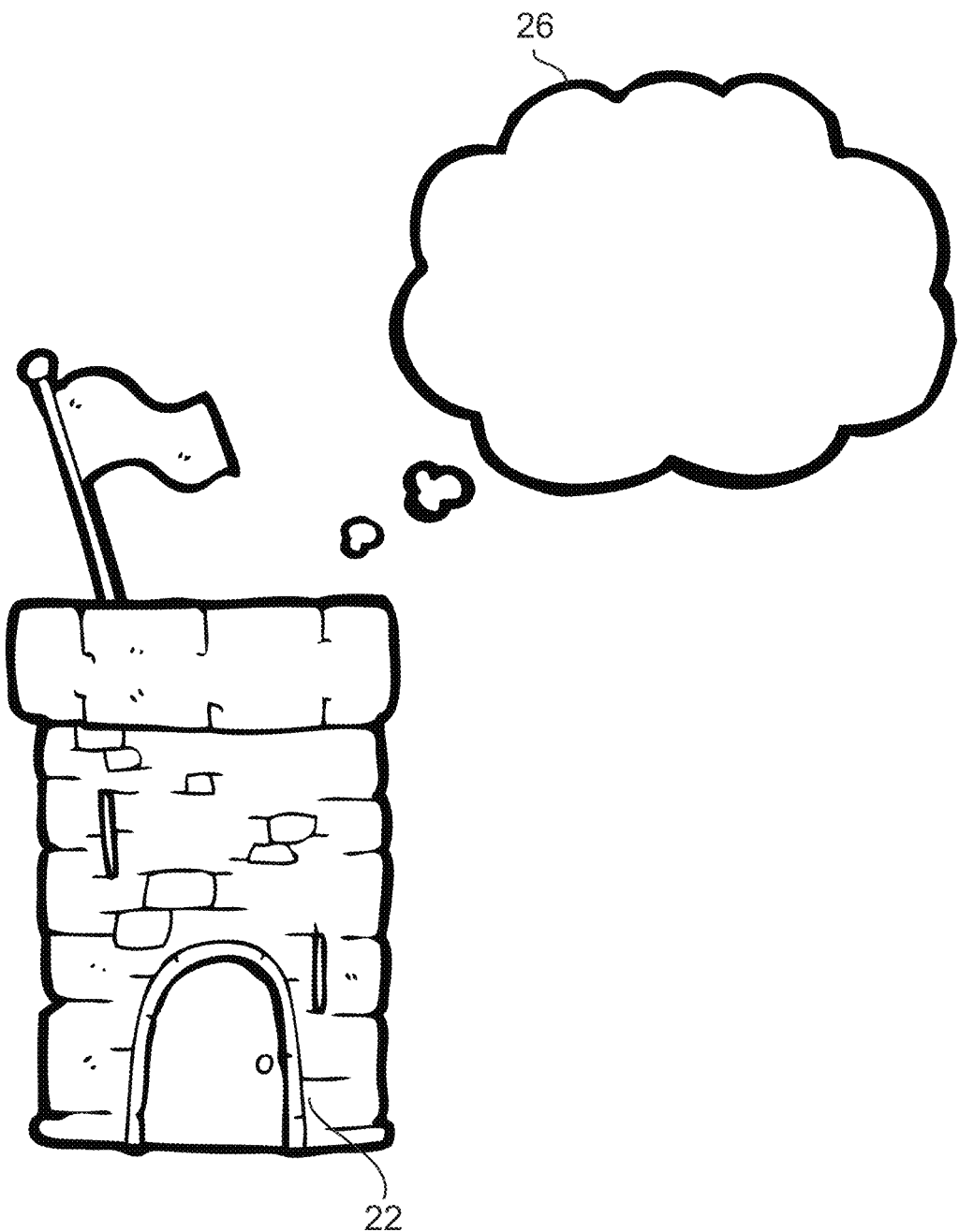
FIG. 9 depicts a system for social interaction regarding features based on geolocation according to an embodiment.
Figure 10:
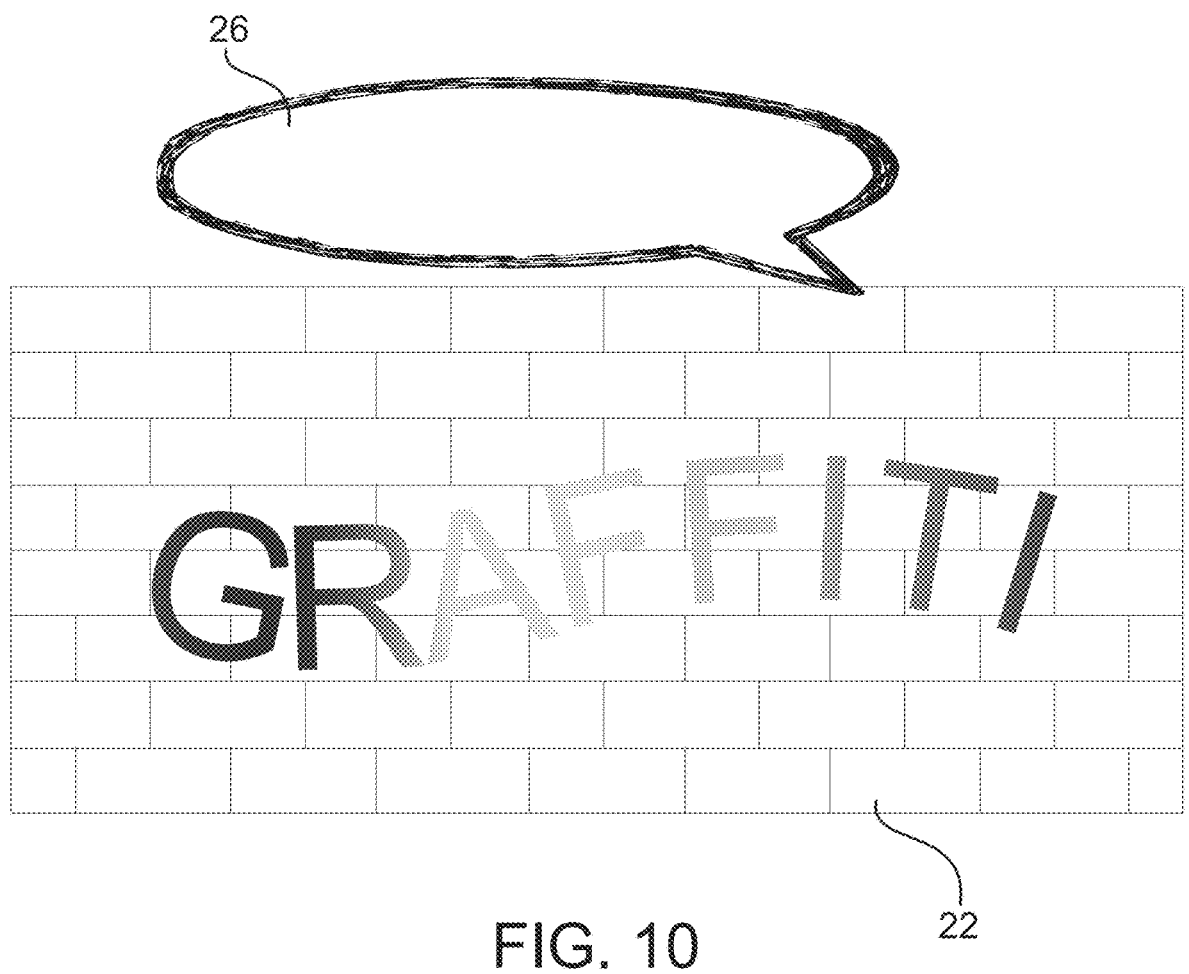
FIG. 10 depicts a system for social interaction regarding features based on geolocation according to an embodiment.
Figure 11:
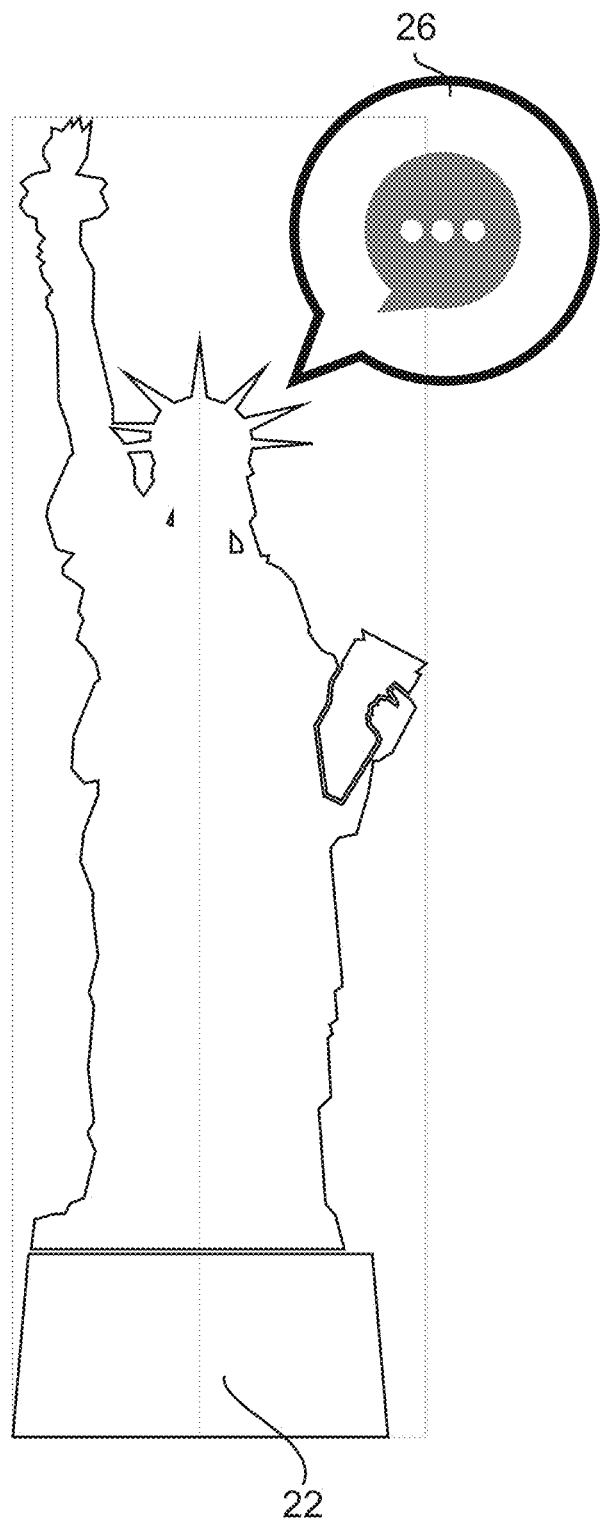
FIG. 11 depicts a system for social interaction regarding features based on geolocation according to an embodiment.
Figure 12:
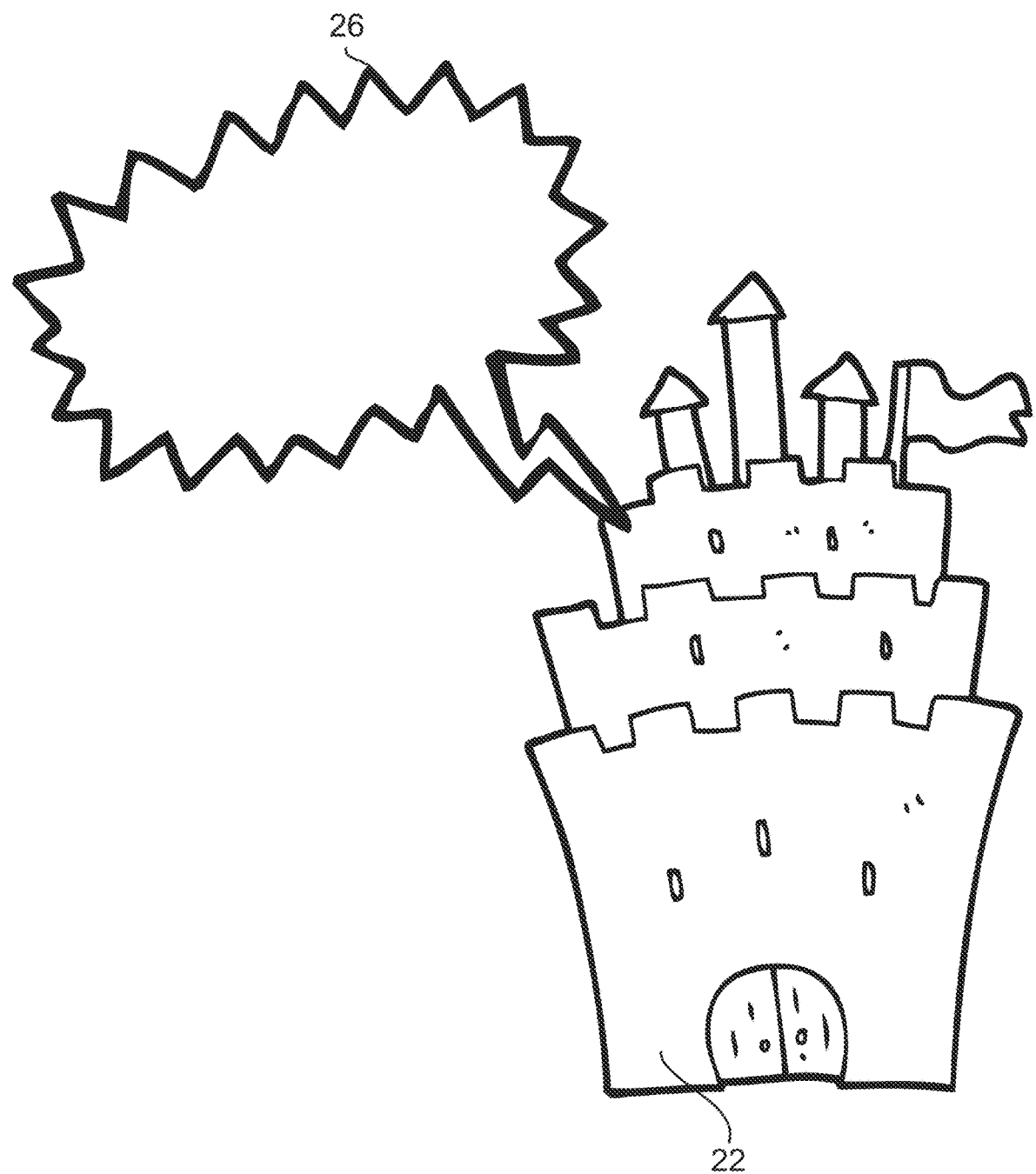
FIG. 12 depicts a system for social interaction regarding features based on geolocation according to an embodiment.
Figure 13:
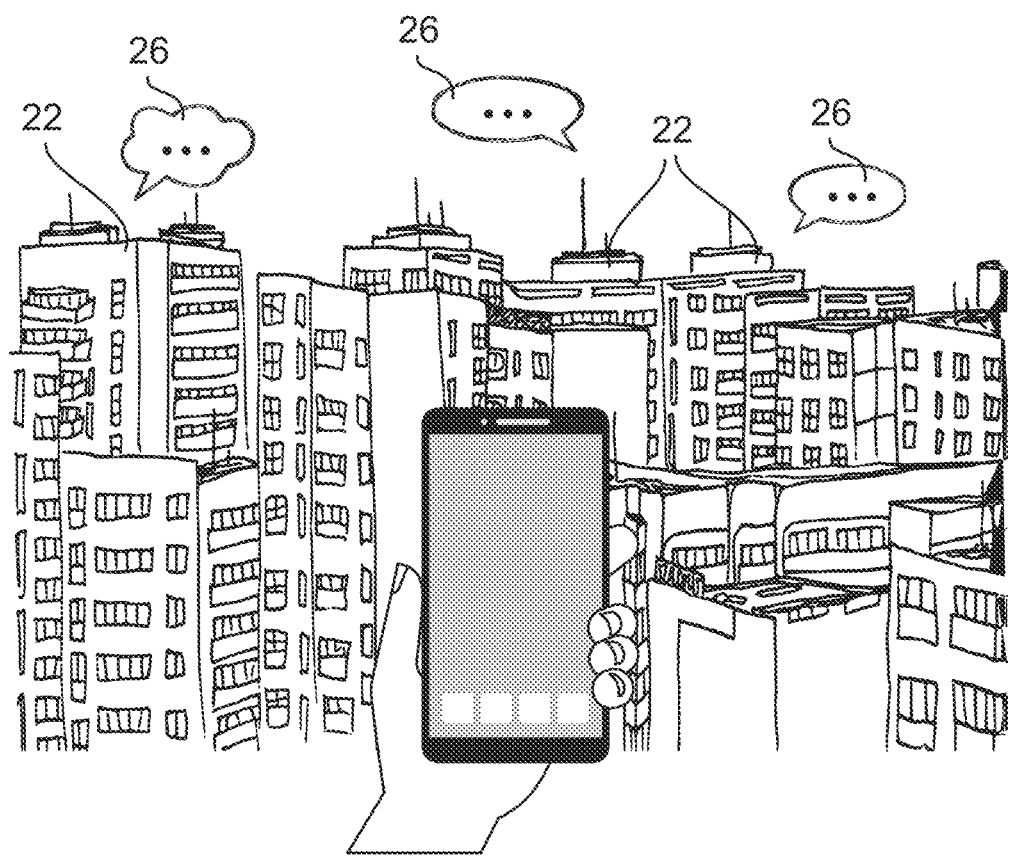
FIG. 13 depicts a system for social interaction regarding features based on geolocation according to an embodiment.
Figure 14:
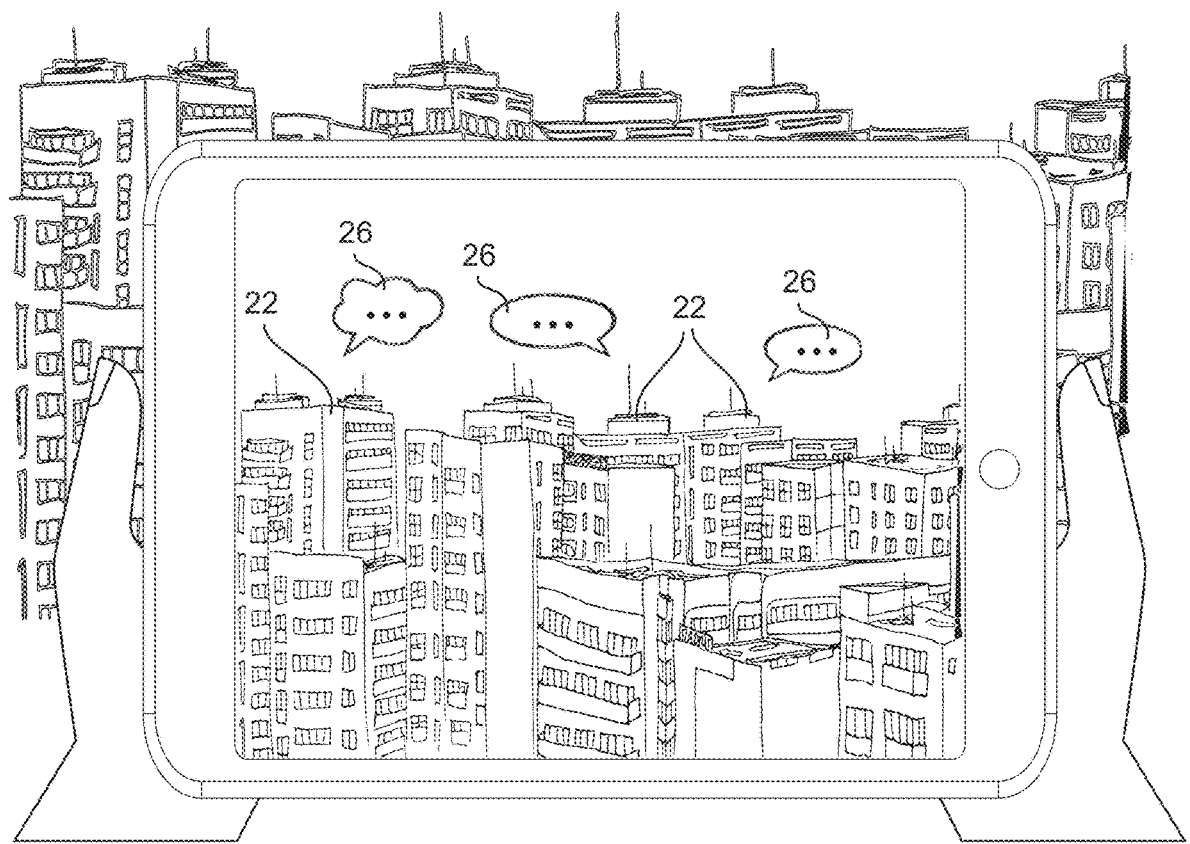
FIG. 14 depicts a system for social interaction regarding features based on geolocation according to an embodiment.

It will be understood that the geo-grouped feature data may be displayed as bubbles of data floating above each feature on the user computing device 12, wherein the bubbles are selectable on the user computing device 12 in order to access the information. In embodiments, the bubbles of data may be differentiated on the display of the user computing device 12 to indicate various types and amounts of data. For example, and not by way of limitation, the bubbles may be different colors to differentiate between the type of content of a feature, as shown in FIG. 6. Further, the bubbles may be different sizes to differentiate between amounts of content, wherein the greater amount of content results in bigger bubbles viewable on the user computing device, as shown in FIGS. 4 and 5. Other distinctions between bubble of data displayed on the user computing device may be made for purposes, such as, but not limited to, bubbles with photos, bubbles with video, bubbles with text, bubbles with combinations of text/photo/video, and the like, such as various bubble shapes depicted in FIG. 7, wherein the shapes of bubbles may also designate different types of content or the like.

It is contemplated that a user that is a driver of a vehicle may elect to receive the geo-grouped feature data in a form that complies with state driving laws, while passengers may have the same or alternative feeds of information.

By way of example only, and not as a limitation, operation of the system 10 may include a user traveling on a train by a certain building on her way to work. The user is operating a user computing device 12 that is the user's smartphone operating a mobile application to access the system 10. The location information of the user computing device 12 is automatically being sent to the server at intervals or continuously. The server 14 process the information to determine that the train and the user within it are within a predetermined distance of a geolocation of the certain building. The server 14 automatically send the geo-grouped feature data 26 to the user computing device 12 for display and access by the user. The geo-grouped feature data 26 may be provided as bubbles of data including text, photos, videos and the like of all users that have posted regarding the certain feature. The geo-grouped feature data 26 may be delivered and displayed on a screen of the user computing device 12 floating above or otherwise associated with a feature as shown in FIGS. 8-14. The user may consume the geo-grouped feature data 26 by selecting the bubbles of data on the user computing device to view and/or read the geo-grouped feature data 26. The user may further submit a post on the certain feature, wherein the post of the user will automatically be added to the geo-grouped feature data 26 for access and consumption by all other users of the system by including the post of the user as part of or another bubble of data. In embodiments, multiple users within the predetermined distance of the geolocation of the same feature may post/comment back and forth in real time or in near real time regarding the feature. Visually presented, the system 10 allows for bubbles of data regarding certain features to be geolocationally associated with the certain features and displayed as floating above the feature in order to be accessible by user computing devices 12 within a certain proximity of the geolocation of the certain features. It allows interaction with individuals who take a common route to work, have common ideas regarding features and the like.

In some embodiments, the geo-grouped data 26 may be viewable as floating bubbles over each feature in an augmented reality or a mixed reality environment displayed on the screen of the user computing device as a camera lens coupled to the user computing device views each feature with a lens of the camera and displays the feature on a screen with the geo-grouped data 26 floating above the feature.

Embodiments may be available on or through the internet, such as through domain names reserved and owned by Applicant that include bubble-chat.com, geochatt.com, wwwchatt.com, gpsbubble.com, gpsthought.com or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A system for social interaction regarding features based on geolocation, the system comprising:
   a server having a memory storing geo-grouped feature data;
   a plurality of user computing devices coupled to the server;
   a first user computing device coupled to the server, wherein the server is programmed to:
   receive and store from the plurality of user computing devices posts and location information associated with the posts corresponding to a feature, wherein the posts from the plurality of user computing device is stored as part of the geo-grouped feature data;
   receive location information from the first user computing device, wherein the first user computing device operates a mobile application installed thereon, wherein operation of the mobile application couples the first user computing device to the server, and determines a location of the first user computing device and sends the location information comprising the location of the first user computing device to the server;
   automatically process the location information and determine what features have a geolocation near the location of the first user computing device;
   automatically find and retrieve geo-grouped feature data corresponding to the features near the geolocation of the first user computing device;
   automatically deliver the geo-grouped data to the first user computing device for display and direct access, in response to the first user computing device being within a predetermined distance of the features corresponding to the geo-grouped property data, wherein the first user computing device displays the geo-grouped feature data associated with each of the features as a floating bubble proximate the display of the corresponding feature with which it is associated, wherein the display of the corresponding feature with which the floating bubble is displayed is a part of an augmented reality environment displayed on the first user computing device as a lens of the camera views the features, wherein the floating bubbles are different sizes to differentiate between an amount of posts, and wherein greater the amount of posts results in a bigger size of the floating bubble viewable on the first user computing device and the floating bubbles are different colors to differentiate between content types, wherein the floating bubbles are a first color for floating bubbles having only text content and the floating bubbles are second color for floating bubbles having text and other media content; and
   receive and store a post from the first user computing device, wherein the post from the first user computing device is stored as part of the geo-grouped feature data for the feature corresponding to the floating bubble selected with the first user computing device; and
   wherein location of a plurality of user computing devices within a predetermined distance of a feature enables a user of any of the plurality of user computing devices to deliver a post associated with the feature to each of the remaining user computing devices of the plurality of computing devices in real time via the server through the established connections.

2. The system for social interaction of claim 1, wherein the first user computing device is located within a vehicle and is operable by a user within the vehicle.

3. The system for social interaction of claim 1 wherein the other media content comprises photos, graphics, videos, and audio.

* * * * *